United States Patent

[11] 3,597,067

| | | |
|---|---|---|
| [72] | Inventor | Yasutoshi Okuzawa<br>Saitama, Japan |
| [21] | Appl. No. | 833,910 |
| [22] | Filed | June 17, 1969 |
| [45] | Patented | Aug. 3, 1971 |
| [73] | Assignee | Fuji Photo Film Co., Ltd.<br>Saitama, Japan |
| [32] | Priority | June 25, 1968 |
| [33] | | Japan |
| [31] | | 43/53747 |

[54] ONE FRAME FEEDING PROJECTION DEVICE FOR A FILM PROJECTOR
8 Claims, 3 Drawing Figs.

[52] U.S. Cl............................................. 352/169,
352/214, 352/216
[51] Int. Cl......................................................... G03b 21/38,
G03b 9/16
[50] Field of Search............................................. 352/169,
137, 177, 204, 208—210, 214—216, 218—220;
353/88

[56] References Cited
UNITED STATES PATENTS

| | | | |
|---|---|---|---|
| 1,125,660 | 1/1915 | Corbin et al. ................. | 352/214 |
| 2,047,983 | 7/1936 | Richards ...................... | 352/214 |
| 2,472,299 | 6/1949 | Jerome......................... | 352/169 |
| 2,763,179 | 9/1956 | Rozmuski..................... | 352/220 |
| 3,232,690 | 1/1966 | McKee et al.... .............. | 352/216 X |
| 3,303,271 | 2/1967 | Hecker......................... | 352/208 X |

Primary Examiner—Louis R. Prince
Assistant Examiner—Joseph W. Roskos
Attorney—Sughrue, Rothwell, Mion, Zinn and Macpeak ABSTRACT: A film projection device employs a secondary shutter blade having a single shutter opening which rotates in synchronism with a standard multisector opening blade during manual single frame film feeding.

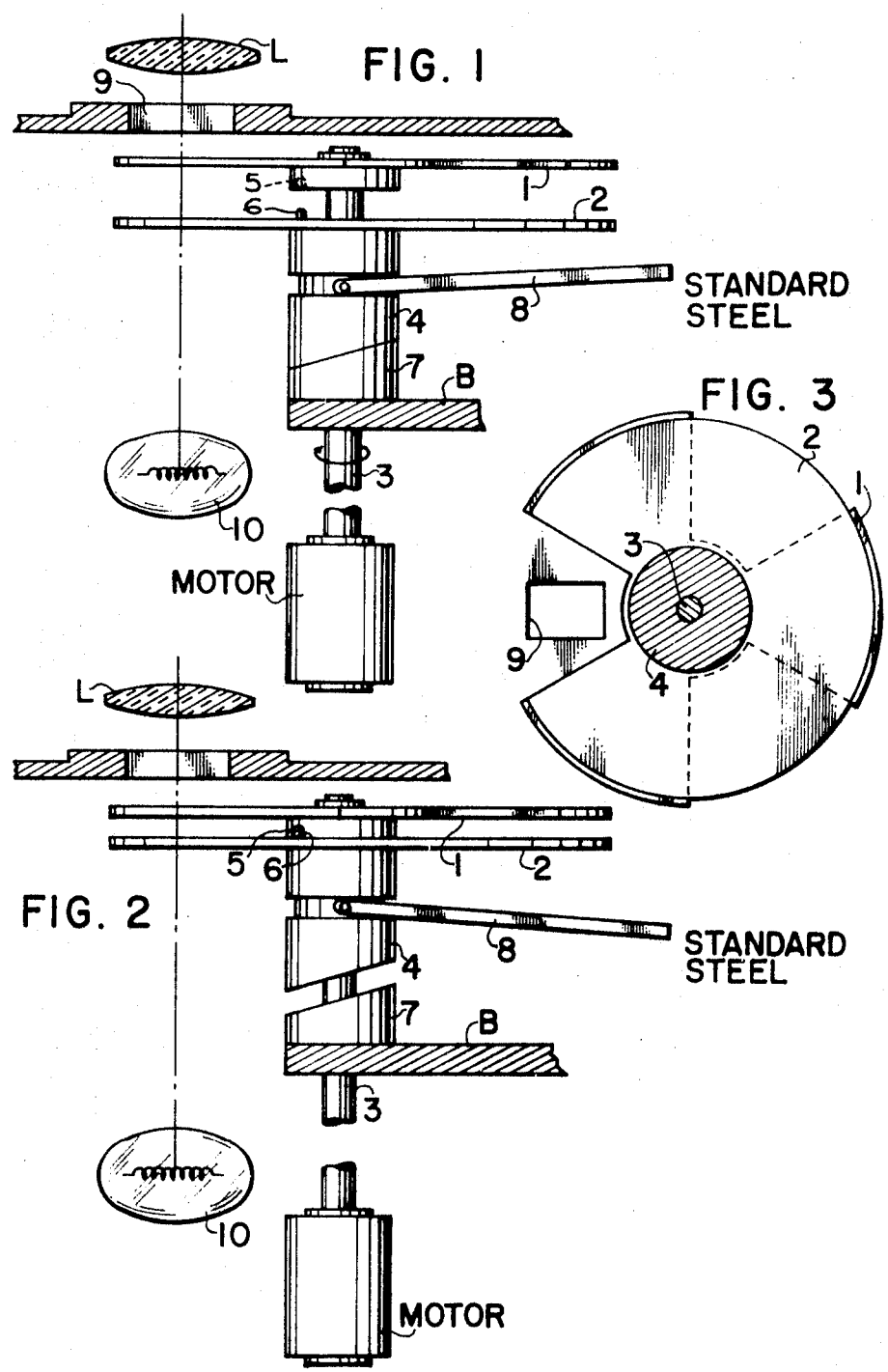

ONE FRAME FEEDING PROJECTION DEVICE FOR A FILM PROJECTOR

BACKGROUND OF THE INVENTION

1. Field of the Invention

This invention relates to a film feeding projection device for a projector, and more particularly to a one frame feeding projection device for 8 mm film projectors and the like.

2. Description of the Prior Art

Heretofore, in the small film-type projectors, the shutter blade has been provided with several sections which intersect the light from the light source several times for one frame in order to prevent flicker of the projected image on the screen. Accordingly, though the flicker has been prevented in case of standard speed projection, in case of slow projection such as one frame feeding or still projection, the image on the projection screen is hard to see, since the light is cut several times by the shutter for each frame. Moreover, since the shutter blade is provided with several sections, sometimes the frame feeding is inaccurate when feeding film manually.

SUMMARY OF THE INVENTION

The present invention provides a one frame feeding projection device for a film projector which comprises a first shutter for standard speed projection having a plurality of sections, and a second shutter for one frame feeding projection disposed adjacent to said first shutter and coaxially therewith. The second shutter has an opening corresponding to one of said openings of said first shutter. The second shutter is synchronized with the rotation of said first shutter for still projections so that cutting of the light from the light source is made once for each frame.

The object of this invention is to provide a one frame feeding projection device for intersecting the light from the light source once for each frame. This invention provides a one frame feeding projection device for feeding the film accurately in case of low speed projection such as single frame feeding or still projection.

BRIEF DESCRIPTION OF THE DRAWINGS

FIGS. 1 and 2 are sectional side views showing the main part of the one frame feeding projection device in accordance with the present invention; and FIG. 3 is an explanatory view of the relationship of the shutter blades in the device in accordance with the present invention.

DESCRIPTION OF THE PREFERRED EMBODIMENT

Referring to the drawings, a standard speed projection shutter 1 has several spaced, sectorlike sections secured to a driving shaft 3 as shown in FIG. 1. The reference character 2 denotes a second shutter blade which has only one opening corresponding to one of said openings of said first shutter blade 1. The second shutter blade 2 is supported by a shutter supporting portion 4 loosely fitted to driving shaft 3.

The shutter supporting portion 4 is provided at one end thereof with a projection 6 to be inserted into a recessed portion 5 provided on the standard speed projection shutter 1, and is provided with an inclined face at the other end thereof. The reference character 7 denotes a position regulating member having an inclined face with abuts the inclined face of the shutter supporting portion 4. The position regulating member 7 is fixed to the body of the projector B. The reference character 8 denotes a switching lever mounted to the shutter supporting portion 4. The switching lever 8 is coupled to the shutter supporting portion without disturbing the rotation of the shutter supporting portion 4 and is associated with a heat insulating filter and a driving motor and other means. The reference character 9 denotes an aperture portion, 10 a light source, L a projection lens, and B denotes a projector body.

With the one frame feeding projection device in accordance with this invention constructed as above, the conditions of standard speed projection shown in FIG. 1 are changed to the conditions of still projection shown in FIG. 2 by switching lever 8 from the standard speed projection position to the still projection position. When the switch lever 8 is switched, the projection 6 provided on the end of the standard speed projection shutter supporting portion is brought into engagement with the recess 5 provided on the standard speed projection shutter 1. The single frame feeding projection shutter 2 is thus made to rotate together with the standard speed projection shutter 1. By this engagement, the standard speed projection shutter 1 is fixed to the one frame feeding projection shutter 2 so that one of the openings of the standard speed projection shutter 1 is positioned in alignment with the opening of the single frame feeding projection shutter 2. Thus, cutting of the light from the light source occurs once for each frame feeding of the film.

At the same time when the switching lever 8 is switched to the still projection, the switching lever 8 causes a heat reducing filter to come into the light path and stops the rotation of the driving motor.

By switching the lever 8 from the still projection condition of FIG. 2 to the standard speed projection condition of FIG. 1, the shutter supporting portion 4 is moved out of engagement with the standard projection shutter 1. The projection 6 on the shutter supporting portion 4 disengages from the recess 5 on the single frame projection shutter 2 and the rotation of the single frame feeding projection shutter 2 stops. At the same time, when the switching lever 8 is switched, the heat reducing filter is removed and the driving motor is started. The shutter supporting portion 4 of the single frame feeding projection shutter 2 removed from the standard speed projection shutter 1 is so located that the opening of the single frame feeding projection shutter prevents disturbing of the light path from the light source of the projector due to the engagement of the inclined face of the shutter supporting portion 4 with the inclined face of the position regulating member 7 fixed to the projector body portion B. Thus, only the standard speed projection shutter is rotated and the image can be projected onto the projection screen without flicker.

As described hereinabove, in accordance with the present invention, good pictures without flicker can be projected on the screen by the standard speed projection shutter since the single frame feeding projection shutter will not disturb the light path once its position is fixed by the position regulating member in case of standard speed projection. In case of still projection, the shutter cuts the light path only once for each frame, and the undesirable flicker or the like is completely eliminated.

Moreover, since the cutting of the light is only once for each frame, in the case of still projection, film feeding can be made considerably accurate. This invention is particularly effective for such researching fields as memomotion systems and low speed automatic film feeding projection.

What I claim is:

1. In a projection device for a film projector which comprises a first shutter for standard speed projection having a plurality of sections, separated by openings, the improvement comprising: a second shutter for single frame feeding projection disposed adjacent to said first shutter and coaxially therewith and having one opening corresponding to one of said openings of said first shutter, said first and second shutters comprising coaxial discs, means rotating said first disc about its axis, means supporting said second disc for axial shifting relative to said first disc, means for moving said second disc axially into positive driving engagement with said first disc for synchronous rotation therewith and means for locating said second disc in a selected angular position with respect to said first disc when uncoupled therefrom.

2. The device as claimed in claim 1 wherein: said locating means comprises an inclined axial face on said second disc and a reversely inclined face on a stationary support underlying the same.

3. The device as claimed in claim 1 wherein said first disc carries a recess, and said second disc carries a projection for insertion therein to effect positive driving engagement between said discs.

4. The device as claimed in claim 3, wherein: said locating means comprises an inclined axial face on said second disc and a reversely inclined face on a stationary support underlying the same.

5. The device as claimed in claim 4, wherein said first disc is carried by a driving shaft which passes freely through said second disc and said means for moving said second disc axially into positive driving engagement with said first disc comprises oscillating lever means operatively coupled thereto.

6. The device as claimed in claim 4, wherein said first shutter is carried by a driving shaft which passes freely through said second disc and said device further includes oscillating lever means operatively coupled to said second disc for causing said second disc to move axially into positive driving engagement with said first disc.

7. The device as claimed in claim 3, wherein said first shutter is carried by a driving shaft which passes freely through said second disc and said means for moving said second disc axially into positive driving engagement with said first disc comprises lever means operatively coupled to said disc.

8. The device as claimed in claim 1, wherein said first shutter is carried by a driving shaft which passes freely through said second disc and said means for causing said second disc to move axially into positive driving engagement with said first disc comprises oscillating lever means coupled to said second disc.